W. C. FIRTH.
HOLDING DEVICE.
APPLICATION FILED OCT. 21, 1918.
1,296,275.
Patented Mar. 4, 1919.
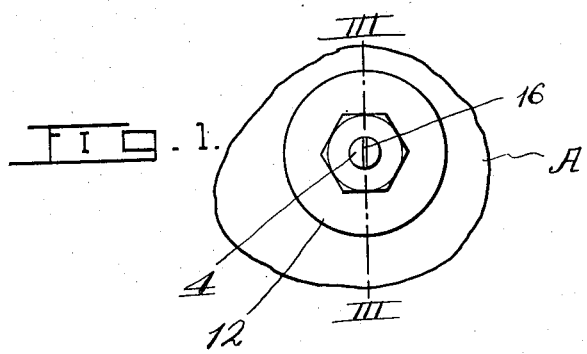
FIG. 1.
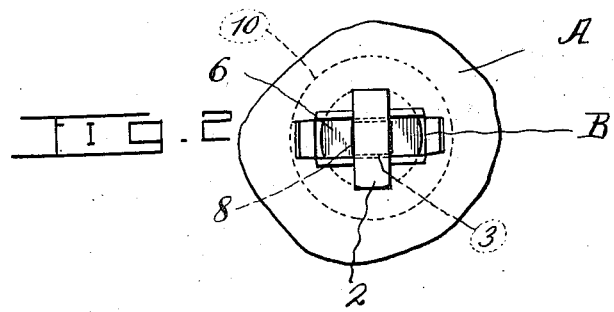
FIG. 2.
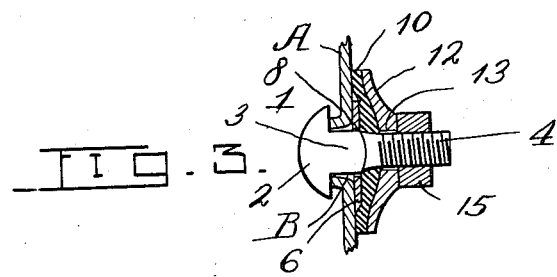
FIG. 3.
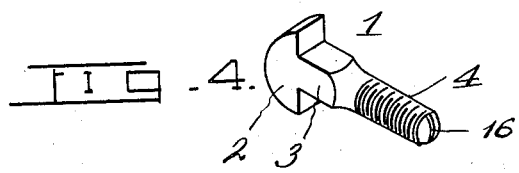
FIG. 4.
FIG. 5.  FIG. 6.
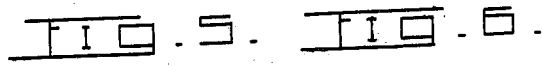
WITNESSES:
L. J. Fischer
INVENTOR:
William C. Firth,
BY
F. G. Fischer,
ATTORNEY

UNITED STATES PATENT OFFICE.

WILLIAM C. FIRTH, OF EAST CLEVELAND, OHIO.

HOLDING DEVICE.

1,296,275.     Specification of Letters Patent.     Patented Mar. 4, 1919.

Application filed October 21, 1918. Serial No. 259,093.

*To all whom it may concern:*

Be it known that I, WILLIAM C. FIRTH, a citizen of the United States, residing at East Cleveland, in the county of Cuyahoga and State of Ohio, have invented certain new and useful Improvements in Holding Devices, of which the following is a specification.

My invention relates to holding devices, and one object is to provide a simple, inexpensive and efficient device of this character whereby leaks in hot water boilers and other sheet metal containers can be quickly and reliably repaired. The device can also be used to advantage on any kind of sheet metal work where access can be had to only one side thereof. For instance, the device can be used for securing brackets on metal walls, guy-wire hooks on smoke stacks, etc., and in order that the invention may be fully understood, reference will now be made to the accompanying drawing, in which:

Figure 1 is a broken elevation of one side of a sheet metal wall with my device in position thereon.

Fig. 2 shows the reverse side of the wall with my device in position thereon.

Fig. 3 is a vertical section on line III—III of Fig. 1.

Fig. 4 is a detail perspective of a bolt constituting an important feature of the invention.

Fig. 5 is an edge view of a gasket.

Fig. 6 is an edge view of a washer.

1 designates a bolt consisting of a T-head 2, a rectangular shoulder 3 integral with said T-head 2, and a threaded, cylindrical portion 4 integral with said shoulder 3.

6 designates a small metal washer having a rectangular aperture 8 to fit around the shoulder 3 of the bolt 1, as disclosed by Figs. 2 and 3.

10 designates a gasket consisting of rubber or other suitable material and having a central opening to fit over the cylindrical portion 4 of the bolt.

12 designates a metal washer having a central opening 13 to fit loosely over the cylindrical portion 4 of the bolt.

15 designates a nut threaded upon the bolt 1 to hold the gasket 10 and the washers 6 and 12 upon the bolt.

A groove 16 is formed in the cylindrical end of the bolt 1, to indicate the position of the T-head 2.

A designates the wall of a sheet metal tank, smoke stack, or other element.

In practice, when my device is to be applied to a sheet metal wall as A, a slot B of suitable size to admit the T-head 2 of the bolt 1 is cut in said wall by a suitable tool. The bolt is then inserted head first in the slot B, and then rotated to bring the T-head 2 crosswise to said slot as disclosed by Fig. 2. The bolt 1 is then pulled outwardly until the T-head 2 abuts the inner side of the wall A and the shoulder 3 projects through the slot B to prevent the bolt from rotating in said slot. The small washer 6 is then slipped upon the rectangular portion 3 of the bolt and against the outer face of the wall A, after which the gasket 10, the washer 12, and the nut 15 are placed upon the bolt in the order mentioned. As the nut 15 is screwed upon the bolt, it forces the washer 12 against the gasket 10 which in turn is forced firmly against the small washer 8 and the face of the wall A, so that water or other fluid cannot leak through the slot B.

The washer 12 is made in truncated form to add rigidity thereto and the gasket 10 is also made in truncated form, so that the extra thickness thus provided at its aperture will be firmly forced around the periphery of the bolt when the nut 15 is screwed up and thus form a fluid-tight joint. The small washer 6 backs up the gasket 10 and prevents its central portion from being forced into the slot B.

In work where a fluid-tight joint is not desired the gasket and the washers may be dispensed with.

From the foregoing description it will be readily understood that I have produced a device whereby leaks in the walls of boilers, etc., can be quickly and permanently sealed. It is also apparent that the device may be used to advantage for other purposes than those mentioned, and while I have shown and described the preferred form of my invention, I reserve the right to make such changes in the construction, combination, and arrangement of parts, as properly fall within the spirit and scope of the claims.

Having thus described my invention, what I claim and desire to secure by Letters Patent, is:

1. In a device of the character described, a bolt consisting of a T-head, a rectangular shoulder integral with said T-head, and a cylindrical threaded portion integral with said shoulder; a washer loosely-fitting the cylindrical portion of the bolt, and a nut threaded on the cylindrical portion of the bolt to force said washer toward the T-head.

2. In a device of the character described, a bolt consisting of a T-head, a rectangular shoulder integral with said T-head, and a cylindrical threaded portion integral with said shoulder; a washer loosely-fitting the cylindrical portion of the bolt, a nut threaded on the cylindrical portion of the bolt to force said washer toward the T-head, and a gasket on the bolt bearing against said washer.

3. In a device of the character described, a bolt consisting of a T-head adapted to be inserted through a slot in a sheet metal wall and turned crosswise to said slot, a rectangular shoulder integral with said T-head to engage the sides of the slot and keep the bolt from rotating in the slot, and a cylindrical threaded portion integral with said shoulder; a washer loosely-fitting the cylindrical portion of the bolt, and a nut threaded on the cylindrical portion of the bolt to force said washer toward the T-head.

4. In a device of the character described, a bolt consisting of a T-head adapted to be inserted through a slot in a sheet metal wall and turned crosswise to said slot, a rectangular shoulder integral with said T-head to engage the sides of the slot and keep the bolt from rotating; and a cylindrical threaded portion integral with said shoulder; a small washer having a rectangular opening to fit the shoulder of the bolt and bear against the outer surface of the sheet metal wall, a gasket slipped upon the bolt and bearing against the small washer, a large washer slipped upon the bolt and bearing against the gasket, and a nut threaded upon the bolt, for the purpose set forth and described.

5. In a device of the character described, a bolt consisting of a T-head adapted to be inserted through a slot in a sheet metal wall and turned crosswise to said slot, a shoulder integral with said T-head to engage the sides of the slot and keep the bolt from rotating in the slot, and a cylindrical threaded portion integral with said shoulder; a washer loosely-fitting the cylindrical portion of the bolt, and a nut threaded on the cylindrical portion of the bolt to force said washer toward the T-head.

In testimony whereof I affix my signature in the presence of two witnesses.

WILLIAM C. FIRTH.

Witnesses:
  CARL D. JENSEN,
  THOMAS H. JENSEN.